United States Patent [19]

Hennings et al.

[11] Patent Number: 4,478,127
[45] Date of Patent: Oct. 23, 1984

[54] BOMB SADDLE INTERFACE MODULE

[75] Inventors: George N. Hennings; Larry F. Brauer; Raymond H. DeHarrold, all of Ridgecrest, Calif.

[73] Assignee: The United States of America as represented by the Secretary of the Navy, Washington, D.C.

[21] Appl. No.: 422,045

[22] Filed: Sep. 23, 1982

[51] Int. Cl.³ .......................... B64D 1/04; F42C 5/00; F42C 15/12
[52] U.S. Cl. .................................. 89/1.5 D; 102/225
[58] Field of Search ............. 89/1.5 D, 1.5 R, 1.5 G, 89/1.5 E; 102/382, 225; 244/137 R

[56] References Cited

U.S. PATENT DOCUMENTS

| | | | |
|---|---|---|---|
| 1,643,468 | 9/1927 | Paulus. | |
| 3,158,060 | 11/1964 | Semenoff et al. | 89/1.5 D |
| 3,326,083 | 6/1967 | Johnson | 89/1.5 |
| 3,366,008 | 1/1968 | Grandy | 89/1.5 |
| 3,476,012 | 11/1969 | Jackson | 89/1.5 |
| 3,492,911 | 2/1970 | Adams | 89/1.5 |
| 3,575,084 | 4/1971 | Glendenning et al. | 89/1.5 |
| 3,667,342 | 6/1972 | Warnock et al. | 89/1.5 D |
| 3,703,844 | 11/1972 | Bleikamp, Jr. | 89/1.5 |
| 3,728,935 | 4/1973 | Magorian | 89/1.5 D X |
| 3,738,222 | 6/1973 | Halpern et al. | 89/1.5 |
| 3,960,086 | 6/1976 | Fisher | 89/1.5 D X |
| 3,961,577 | 6/1976 | O'Steen | 89/1.5 D X |
| 4,037,517 | 7/1977 | Briggs | 89/1.5 D |
| 4,167,887 | 9/1979 | Magro | 89/1.5 |
| 4,322,998 | 4/1982 | Fowler et al. | 89/1.5 D |
| 4,350,074 | 9/1982 | Rouget et al. | 89/1.5 D |

Primary Examiner—David H. Brown
Attorney, Agent, or Firm—Robert F. Beers; W. Thom Skeer; W. D. English

[57] ABSTRACT

The invention relates to an electrical mechanical interfacing device for safe and arm fuze systems of different stores such that a variable electrical and mechanical connecting capability is provided for different aircraft requirements.

11 Claims, 4 Drawing Figures

BOMB SADDLE INTERFACE MODULE

BACKGROUND OF THE INVENTION

1. Field of the Invention

The invention lies in the field of mechanical arts. More specifically, the invention relates to safety-arming devices for weapons systems to prevent accidental arming of these weapons until removal a safe distance from their carrier. More exactly, the invention describes a pull-type electro mechanical control mechanism for a load to be jettisoned or dropped from a vehicle, inter alia, an aircraft. In particular, this invention discloses an electro mechanical interfacing unit enabling a varitey of free-fall weapons to be interchanged and utilized on a variety of different aircraft, while concomitantly providing a fuze encoding means, and a means for generating power to the store once jettisoned. Specifically, but not necessarily limited thereto, the disclosed invention describes a bomb saddle interfacing device enabling both electrical and mechanical communication between a bomb fuze and variable aircraft mountings for a store, thereby providing variable fuze encoding modes and further providing a self-contained power generating means to eliminate the dangerous requirement of power connection to the aircraft as well as bulky energy storage devices traditionally carried in stores to provide power to the fuze when the store is released from the aircraft.

2. Description of the Prior Art

One of the most critical elements in conventional ordnance is the safety-arming device. The primary function of the safety-arming device is to maintain the weapon in a safe condition until an arming signal is received. Upon receipt of the arming signal, the safety-arming device transforms the weapon from a safe condition into an armed condition where the main explosive charge can then be detonated.

These functions are normally performed by controlling the alignment of the sensitive explosive components of the warhead initiation system. In the safe position, the primary initiation explosives are misaligned with the booster/warhead explosives, preventing detonation prior to arming. Arming started upon receiving a unique set of inputs into the fuze indicating release from the aircraft. Upon obtaining a safe separation distance or time, the initiation explosives are aligned with the booster/warhead explosives. In the position initiation of the sensitive explosives will cause the warhead to detonate. Initiation in the safe condition will result in a dud weapon with no booster/warhead detonation.

Previous bomb fuze safety-arming devices utilized either mechanical escapements or electronic timers to provide safe separation arming time delays. Also, many of the safety-arming designs employed stored energy, such as pyrotechnic bellows motors, to arm the fuze. These techniques have proven to present safety hazards and yield low reliability in previous bomb fuzes.

Current bomb fuze safety-arming devices use both mechanical escapements and electronic timers to provide safe separation arming time delays. Where prior art predominantly dealt with mechanically linking a store with the aircraft in a safety-arm device, current applications necessitate a need for both mechanical and electrical connections of the aircraft with a store. In addition, there is a need for an electro-mechanical connection of variable stores with different connecting modes on different aircraft.

The use of mechanical escapements as a safe-arm time delay is limited for two major reasons. First, the escapement mechanism technology is rapidly disappearing with the advent of the digital watch technology, resulting in a sharp decrease in manufacturing capabilities coupled with a rise in cost. Second, the flexibility of mechanical timers is poor, resulting in a high cost of arming time options with relatively poor timing accuracy. Nonetheless, the advantage in using a mechanical escapement is that a mechanical interlock is present in a safety-arming device mechanism. This mechanical interlock provides a high degree of safety unless the escapement goes into a "runaway" condition and functions improperly.

In contrast to the mechanical escapement, the electronic timer can provide a very accurate reference time. Unfortunately, electronic timers do not provide a mechanical interlock and have failure modes which allow instantaneous arming. Also, since the mechanical interlock is eliminated arming may bypass the timer entirely and stored energy can arm the safety-arm device prematurely.

Stored energy devices incorporated in current bomb fuze technology normally incorporate either stored mechanical energy (springs) or stored chemical energy (bellows motors). This energy release performs the arming function and is capable of initiating the arming sequence without using any environmental energy. It is this feature that poses the greatest safety failure potential and is of the greatest concern.

Therefore, current applications accomplish the safety-arming task by utilizing an electro-mechanical arming mechanism. These mechanisms provide a crude time reference which may be used as a standard for electronic timers in addition to positive mechanical interlock. It is subsequently highly desirable that electro-mechanical communication between this new fuze technology and the aircraft carrying the store be given effect.

It is to be noted that current aircraft designs with respect to bomb interfacing capabilities are generally inconsistent in the manner and means of connecting different stores to different aircraft. It is therefore highly desirable in terms of economics and efficiency as well as reliability to have an interfacing means capable of being mounted on or within different stores to permit convenient connection and communication of different aircraft having different mounting means with the different stores. It is also desirable to contain these wires, lanyards or connecting means with the store when it is released from the aircraft to prevent damage to the aircraft fuselage by wind generated whipping of the connecting means however, this concept has been disclosed in prior art where arming wires have been designed to remain with the store when it is released from the aircraft upon arming the weapon.

In fact, all prior art dealt almost exclusively with the concept of a mechanical connection of a store to an aircraft, wherein the mechanical connection utilized an arming wire connected to the aircraft from the store, said arming wire would mechanically activate the fuze when the store was released a certain distance from the aircraft, and in many cases the wire was designed to be retained by the store and not the aircraft. These arming wire systems were sufficient for their intended purpose, albeit limited in their application. The arming wire system of any one store was designed specifically to fit on one particular type aircraft. There is a need for adaptability for multiple type stores and arming systems thereon to be conveniently and efficiently adapted to a multiple of different types of aircraft. The disclosed invention herein describes such a system that is not described in any of the prior art. In addition, the disclosed invention further describes an electrical mechanical interfacing capability with different type aircraft that is not disclosed in any prior art.

There has been disclosed in some prior art arming wire assemblies recessed longitudinally in a bomb skin designed for multiple aircraft adaptability. The wire was intended to withdraw from one end of the weapon when the bomb was released and thereby arm the fuze of said bomb while remaining with the weapon as it descended. Additional prior art described arming wire assemblies having moveable, connecting sliders on a wire protected by tubular retaining devices that made the weapon adaptable to a few different aircraft. However, neither of these disclosed inventions in the prior art have the simplicity and design, the economic advantage of fewer components, the convenience of attaching the store to an aircraft thereby substantially curtailing previously needed manpower nor did they describe the significant advantage of an electrical and mechanical link between the aircraft and the store as is needed in present day fruze technology, and is described in the disclosed invention. Furthermore, it has been common practice in the past to provide power from the aircraft directly to the fuze while the store was still attached to the aircraft. An unintended or inadvertent surge of power from the aircraft to the fuze by any number of means accidentally or by act of God could initiate the sequence of events to arm the safety-arm device, and thereby possibly cause an unwarranted detonation of the store, either while on the runway, a flight deck or while the aircraft is in flight with the store attached. Therefore, it is again highly desirable to have a design such that power is not needed from the aircraft to power the store. It is much preferred that the store have its separate self-contained energy generating means for power of the fuze. Previous weapons have dealt with this problem by providing stored energy devices in the weapon itself. Such means were sufficient for their intended purposes; however, such devices added substantial bulk and weight to an environment where both such factors are desired to be at a minimum. In addition, it is desirable and in most cases necessary to provide power to the fuze when the store is separated from the aircraft. The disclosed invention herein solves that problem, by providing a built-in power generating means to supply energy to the fuze only when the store is separated from the aircraft, thereby eliminating any need for power attachment to the aircraft or for any energy storage devices contained within the store.

In summary, and in view of present electro-mechanical fuze technology, as well as the varied adaptability of different stores to different mechanical or electrical mountings on different aircraft, there is a continuing need for a device that can reliably interface the electromechanical fuze of different stores to numerous different type aircrafts, while concommitantly providing self-contained power generating means in the store itself so that no need for power connection exists between the aircraft and the store, thereby further increasing the safety of the overall device.

SUMMARY OF THE INVENTION

This invention conceives a bomb saddle interface module that mounts on or within a store to be carried by different bomb racks of various aircraft. The electromechanical safety-arming device of the fuze of a store is provided communication to the bomb rack of an aircraft carrying the store through the interface module. Leads connecting the interface module to the bomb rack of an aircraft are designed to be retained with the interface module. The interface module remains with the store when the store is jettisoned from the bomb rack to prevent whipping damage of said leads to the fuselage of the aircraft. The interface module further allows encoding of the fuze by alternate means either on the ground through switches in the interface module or in flight through an umbilical cord, coax cable, detachable from the aircraft in flight. Finally, the interface module contains its own power generating means in the form of a wind driven turbine generator such that power is provided to the fuze of a store only upon separation from the bomb rack, thereby increasing safety and reliability of the safety-arming mechanism as well as eliminating substantial bulk and weight in the form of stored energy devices in the store previously used in similar stores.

OBJECTS OF THE INVENTION

It is an object of this invention to provide a combined electrical and mechanical connection capability between a weapon fuze system and the bomb rack of an aircraft carrying the weapon.

It is also an object of the present invention to provide variable fuze option requirements consistent with different aircraft.

It is yet another object of the present invention to provide a common interface position between different weapons and the mounting rack, bomb rack, on which they are carried.

It is a further object of the present invention to provide a weapon system having a self-contained environmentally driven power source providing energy to the fuze for arming and for firing once the weapon is released from the bomb rack of its carrier aircraft.

Another object of the present invention is to provide an interfacing means to a weapon safety-arming system that can be hermetically sealed when the weapon is in storage prior to use.

And, it is an object of the present invention to provide a capability for future electrical digital interfacing as well as the present analog interfacing capability described in the present invention.

These and other objects of the present invention will be more clearly delineated and understood in view of the accompanying drawings and the following specification in the description of the preferred embodiments.

A BRIEF DESCRIPTION OF THE DRAWINGS

Figure 2A:
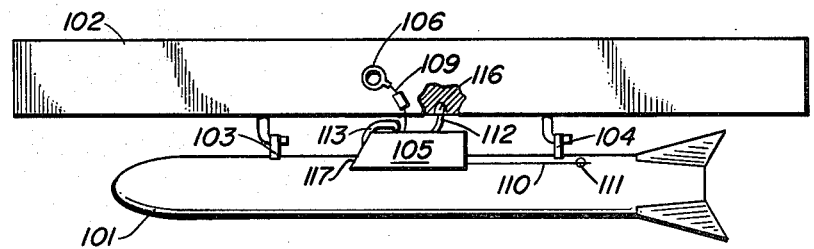
FIG. 2a illustrates the described assembly module connected to an aircraft bomb rack prior to release.
Figure 2B:
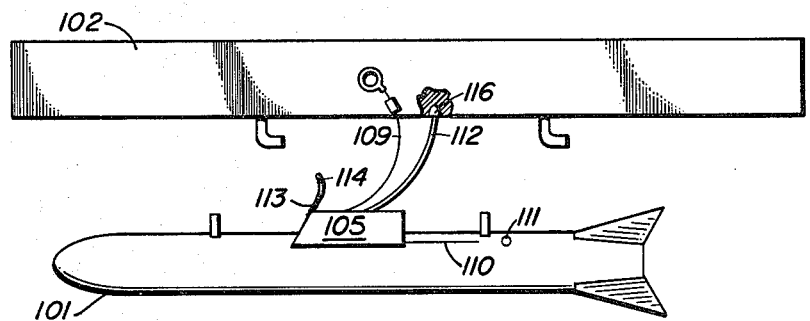
FIG. 2b illustrates the store being separated from the bomb rack.
Figure 2C:
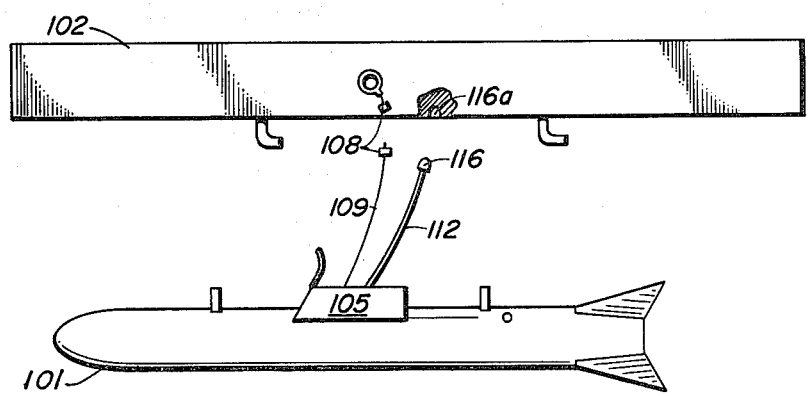

FIG. 2c describes the store when it is released completely from the bomb rack.

DESCRIPTION OF THE PREFERRED EMBODIMENT

Figure 1:
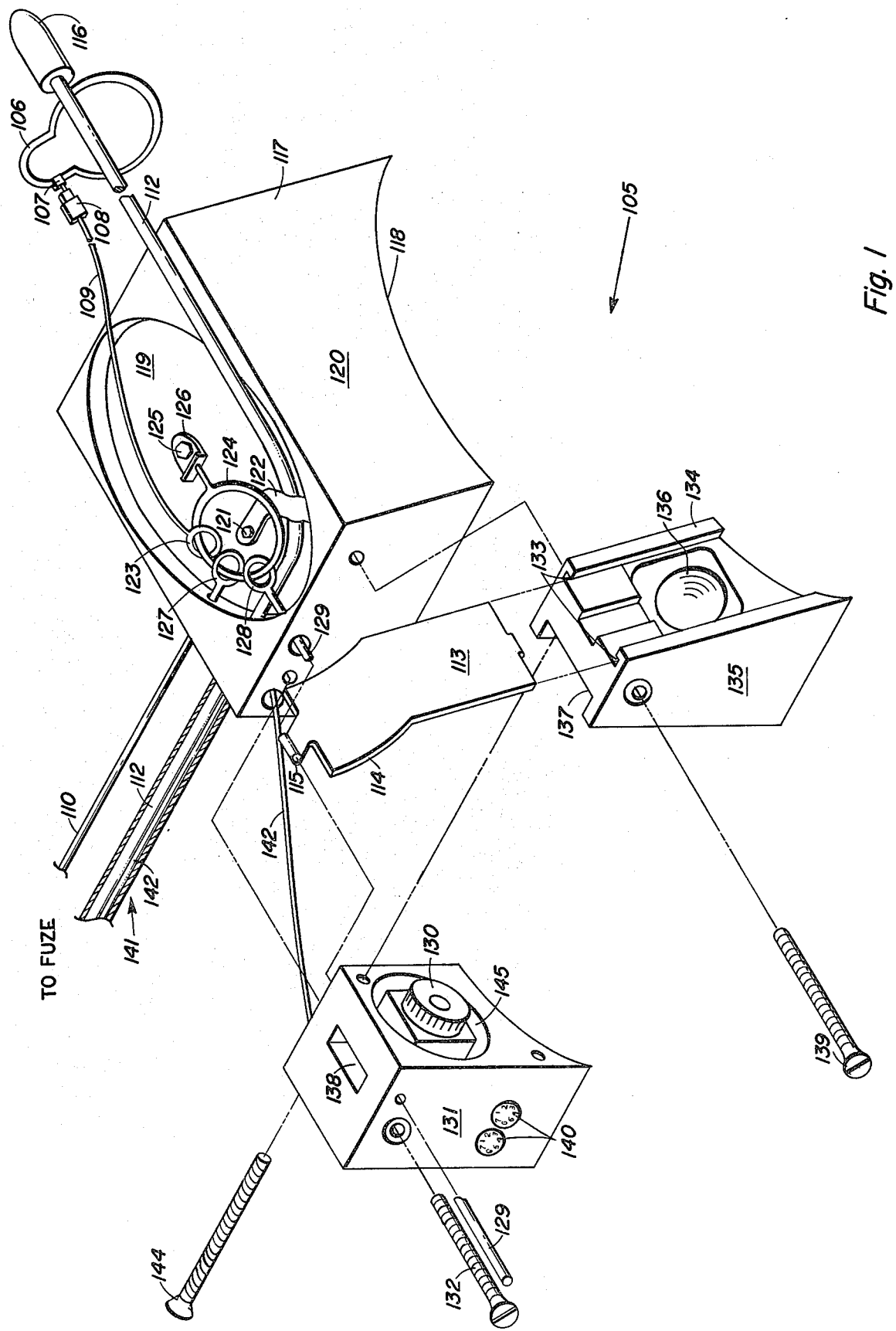
FIG. 1 illustrates a detailed, exploded, perspective view of the bomb saddle interface module and its constituent components.

Referring to FIG. 1 a detailed exploded perspective view of the bomb saddle interface module 105 is illustrated. An assembly housing 120 is provided with a beveled leading edge 117 to diminish the amount of air resistance as a store 101 on which it is mounted travels through the air. A curved underside 118 of assembly housing 120 is described in the preferred embodiment for convenient mounting atop the curved surface of the store 101. A topside recess 119 of assembly housing 120 provides a receptacle for storage of a lanyard 109 together with its constituent components, a quick disconnect element 108 connected by a sliding element 107 to a variable fit connecting ring 106, having at least two different diameters fo variable attachment to different aircraft bomb rack solenoids. Recess 119 also provides storage for a coax cable 12 having a cylindrical end plug 116 and is conveniently wound around the circumference of recess 119 when the unit is in storage. Coax cable 112 is anchored within recess 119 by an anchor bolt 121 and extending finger flange 122 over coax cable 112. Lanyard 109 is also anchored within recess 119 by a lanyard loop 123 at its terminal end intersecting with a large loop 124. Large loop 124 is anchored by a position bolt 125 and restraining flange 126 within recess 119. Large loop 124 also intersects with arming wire loop 127 which is the terminal end of arming wire 110 and with retaining pin loop 128 which is the terminal end of retaining pin 129. Large loop 124 is designed with a specific degree of movement and flexibility such that when lanyard 109 pulls large loop 124, said loop also pulls on arming wire 110 and retaining pin 129 thereby activating arming wire 110 and retaining pin 129. Once these members, arming wire 110 and retaining pin 129 have been pulled to such an extent to activate the same, lanyard 109 breaks at quick disconnect element 108 from an aircraft bomb rack 102 (indicated in FIG. 2) at a predetermined force and distance from the aircraft.

The power providing means in the preferred embodiment is a wind turbine generator 130 housed within a generator housing 131, in a generator recess 145 and connected to the store's fuze by line 142. Generator housing 131 is bolted to assembly housing 120 by generator bolt 132. Recessed sliding door guides 133 positioned on the beveled leading edge 134 of wind duct housing 135 allow sliding door 113 to slide upwardly exposing directing duct 136. Wind duct housing 135 is connected to assembly housing 120 by a duct bolt 139. Sliding door guides 133 provide the positioning means for sliding door 113. Directing duct 136 provides the airflow directing means and has a flared opening leading to a funnelled chamber which impacts on wind turbine generator 130 situated within generator housing 131 and exhaust through exhaust vent 137. It should be noted that exhaust vent 137 lies on the trailing edge of sliding door 113 in its open position as illustrated and thereby creates a substantial reduction in air pressure causing a greater capacity of airflow through directing duct 136.

The airflow obturating means in the preferred embodiment is flexible sliding door 113. Again FIG. 1 illustrates sliding door 113 in its open position having a catch at its opposite end to limit travel thereof and exposing directing duct 136; however, in its closed position sliding door 113 slides along recessed sliding door guides 133, sliding downwardly, thereby closing off directly duct 136. Furthermore, in its closed position curved position 114 of sliding door 113 is bent back in a tensioned manner and is provided with a retaining lip 115 which extends into a retaining slot 138 and is secured therein by retaining pin 129.

Ground encoding means is provided in generator housing 131 by two commerically available BCD encoding switches 140. BCD encoding switches 140 are externally operated upon for ground encoding capacity prior to flight. Generator housing 131 is further connected to wind duct housing 135 by a connecting bolt 144.

Electrical communicating means between assembly housing 120 and fuze 111 (shown in FIG. 2) is provided by a conduit cable assembly 141 extending therebetween. Mechanical communicating means between assembly housing 120 and fuze 111, is provided by arming wire 110 extending therebetween.

FIGS. 2a, 2b, and 2c describe a sequence of events that happen when a store is released from an aircraft with the bomb saddle interface module 105 attached. FIG. 2a illustrates a store 101 attached to a bomb rack 102 by fore 103 and aft 104 mounting lugs of store 101. Bomb saddle interface module 105 is permanently mounted on top or within store 101 in such manner that it fits snuggly between store 101 and bomb rack 102. Connecting ring 106 hooks onto a bomb rack 102 in a conventional manner thereby connecting lanyard 109 from interface module 105 to bomb rack 102. Lanyard 109 as illustrated in FIG. 1 is connected to arming wire 110 which connects through a fuze 111 of store 101. Lanyard 109 thereby provides the mechanical connection with a variable fit connecting ring 106 to arm the fuze 111 on release of store 101 from bomb rack 102.

The electrical connection between store 101 and bomb rack 102 is provided by a coax cable 112 extending from interface module 105 into bomb rack 102 by cylindrical end plug 116. The flexible sliding door 113, preferably metal, is illustrated folded back in its closed position on leading edge 117 of module interface 105 while store 101 is attached to bomb rack 102 by a close tolerance of interface module 105 and bomb rack 102.

Referring now to FIG. 2b store 101 is in the process of being released from bomb rack 102. Lanyard 109 has been extended sufficiently enough to withdraw arming wire 110 from fuze 111 however, both lanyard 109 and coax cable 112 are still in contact with bomb rack 102. On separation of store 101 from bomb rack 102, sliding door 113 has now been permitted to open by air currents blowing against its curved end 114 and thereby locking sliding door 113 into position. Air can now forcefully enter directing duct 136, impacting wind turbine generator 130, and pass through exhaust vent 137 over turbine generator 130 (shown in FIG. 1) wherein a reduced air pressure is created by curved end 114 of sliding door 113. It is at this point that power is being generated to fuze 111 of store 101 by the enclosed wind turbine generator 130, mechanical arming has occured by tension on wire lanyard 109 and arming wire 110, and electrical arming is in the process of occurring through coax cable 112 still attached to bomb rack 102 by cylindrical plug 116.

Referring now to FIG. 2c store 101 has been totally jettisoned and disconnected from bomb rack 102. Cylindrical plug 116 of coax cable 112 has been pulled out of its socket 116a, thereby precluding ay further electrical communication between bomb rack 102 and released store 101. Quick disconnect element 108 of lanyard 109 is shown as being severed once a sufficient distance and tension has been applied to lanyard 109. Store 101 has now been electrically and mechanically armed once store 101 is a safe distance from bomb rack 102.

The method of operation of the bomb saddle interface module as above described will now be delineated. Interface module 105 is permanently affixed to store 101 and can be hermetically sealed prior to mounting store 101 to bomb rack 102 of an aircraft. The hermetic seal, if used, covers above described recess 119 and its constituent components. When this seal is broken, lanyard 109 with its connecting ring 106 is affixed to bomb rack 102 as previously described and as illustrated in FIG. 2a. Coax cable 112 and cylindrical end plug 116 is plugged onto bomb rack 102 at socket 116a. On release of the store 101 from the aircraft bomb rack 102 lanyard 109 first pulls on large loop 124 (FIG. 1) which in turn pulls on arming wire loop 127 and retaining pin loop 128, thereby activating the fuze mechanically by arming wire 110 and thereby releasing tensioned sliding door 113 which then springs open and is further forced open by air currents to expose directing duct 136. Once sliding door 113 is in its open position, wind turbine generator 130 within generator housing 131 provides power to the fuze 111. Any last minute changes in fuze 111 action upon impact is provided by electrical communicating means in the form of coax cable 112 and cylindrical end plug 116 still connected to the aircraft immediately after jettison of the store. If the aircraft to which the store 101 is attached does not have an electrical communicating capability to alter the fuze during flight then the ground encoding means in the form of at least one rotary switch 140 will be set on the ground prior to flight and will control fuze action on impact.

Once the store 101 has dropped a sufficient distance, a predetermined distance from the aircraft to be considered a safe distance, then cylindrical end plug 116 of coax cable 112 is pulled from bomb rack 102 and quick disconnect element 108 breaks after having pulled large loop 124 a sufficient distance, a predetermined distance to activate both arming wire 110 and retaining pin 129. Lanyard 109 is anchored within the assembly housing 120 and cable 112 is also anchored within the assembly housing 120 in such manner that they do not remain with the aircraft but travel down with store 101 thereby precluding whipping damage by wind currents to the aircraft.

We claim:
1. A bomb saddle interface module comprising:
 an assembly housing having a topside recess;
 a generator housing attached to said assembly housing;
 a means for producing electrical power operably mounted within said generator housing;
 a wind duct housing attached to said assembly housing and to said generator housing;
 an arming wire;
 a retaining pin;
 a link flexibly attached to said assembly housing in said topside recess and engaging said arming wire and said retaining pin; and
 a lanyard having one end engaging said link.
2. A bomb saddle interface module comprising:
 an assembly housing having a topside recess;
 a generator housing attached to said assembly housing and defining a generator recess;
 a wind turbine generator mounted within said generator recess;
 a wind duct housing having a beveled leading edge and a curved underside, said wind duct housing being attached to said generator housing and said assembly housing;
 a link attached to said assembly housing;
 an arming wire extending from topside recess and engaging said link;
 a retaining pin extending from said topside recess and engaging said link;
 a lanyard having a first end engaging said link and extending from said link to a second end;
 a coaxial cable attached to said assembly housing in said topside recess at a point spaced from each end of said coaxial cable; and
 at least one encoding switch mounted on said generator housing.
3. The bomb saddle interface module, as defined in claim 2, wherein said assembly housing further comprises a curved underside and a beveled leading edge.
4. The bomb saddle interface module of claim 2 wherein said generator housing further defines a retaining slot and a retaining pin bore intersecting said retaining slot.
5. The bomb saddle interface module of claim 2 wherein said wind duct housing further defines a directing duct communicating between said wind duct housing beveled leading edge and said generator recess, said wind duct housing further defining an exhaust vent communicating between said generator recess and the exterior of said wind duct housing, said wind duct housing further defining recessed sliding door guides on said leading edge coextensive with said directing duct.
6. The bomb sadddle interface module, according to claim 2, wherein said generator housing defines a retaining slot, and wherein said wind duct housing defines a directing duct and has sliding door guides, said wind duct housing further comprising a sliding door slidably engaging said sliding door guides and having a curved end and a retaining lip on said curved end, said retaining lip being positionable in said retaining slot in a first position defined by said sliding door blocking said directing duct, and said sliding door being slidable to a second position unblocking said directing duct.
7. The bomb saddle interface module, according to claim 2, wherein said generator housing defines a retaining slot and a retaining pin bore intersecting said retaining slot, said wind duct housing defines recessed sliding door guides on said beveled leading edge, said wind duct housing further comprising a sliding door slidably engaging said sliding door guides and having a curved end and a retaining lip on said curved end, and wherein said retaining pin extending from said topside recess further extends through said retaining pin bore and is positionable to selectively retain said retaining lip in said retaining slot.
8. The bomb saddle interface module, according to claim 2, wherein said link is flexibly attached within said topside recess.
9. The bomb saddle interface module, according to claim 2, wherein said lanyard has a disconnect element and a slidably attached connecting ring on said second end.
10. The bomb saddle interface module of claim 2 wherein said coaxial cable further comprises a cylindrical end plug on one end.
11. A bomb saddle interface module comprising:

an assembly housing having a curved underside, a topside recess and a beveled leading edge;

a generator housing attached to said assembly housing and defining a generator recess, a retaining slot and a retaining pin bore intersecting said retaining slot;

a wind duct housing having a beveled leading edge and a curved underside, said wind duct housing being attached to said generator housing and said assembly housing and defining a directing duct communicating between said wind duct housing beveled leading edge and said generator recess, said wind duct housing further defining an exhaust vent communicating between said generator recess and the exterior of said wind duct housing, said wind duct housing further defining recessed sliding door guides on said leading edge coextensive with said directing duct;

a sliding door slidably engaging said sliding door guides and having a curved end and a retaining lip on said curved end, said retaining lip being positionable in said retaining slot in a first position defined by said sliding door blocking said directing duct, said sliding door being slidable to a second position unblocking said directing duct;

a retaining pin extending from said topside recess through said retaining pin bore and being positionable to selectively retain said retaining lip in said retaining slot;

an arming wire extending from said topside recess;

a link engaging said arming wire and said retaining pin, said link being flexibly attached to said assembly housing within said topside recess;

a lanyard having a disconnect element and a slidably attached connecting ring on one end, the other end being engaged with said link;

a coaxial cable attached to said assembly housing in said topside recess at a point spaced from each end of said coaxial cable, said coaxial cable having a cylindrical end plug on one end;

a wind turbine generator operably mounted within said generator recess; and at least one encoding switch mounted on said generator housing.

* * * * *